Jan. 5, 1960     R. T. ERICKSON ET AL     2,919,988
METHOD OF PRE-COOKING FISH FOR CANNING
Filed Dec. 23, 1957

REGINALD T. ERICKSON
MAX LOEWE
INVENTORS.

BY Fulwider, Mattingly
and Huntley
ATTORNEYS.

United States Patent Office 2,919,988
Patented Jan. 5, 1960

2,919,988

METHOD OF PRE-COOKING FISH FOR CANNING

Reginald T. Erickson, San Juan Capistrano, and Max Loewe, Long Beach, Calif., assignors to Star-Kist Foods, Inc., Terminal Island, Calif., a corporation of California Application December 23, 1957, Serial No. 704,839

2 Claims. (Cl. 99—111)

The present invention relates generally to the fishing industry and more particularly to a novel and improved method of preparing fish for canning.

The method of the present invention was particularly developed for use in canning tuna and tuna-like fishes. Such fishes include albacore, bluefin, skipjack, yellowfin, bonito and yellowtail. Wherever appearing hereinafter, the term "tuna" should be understood as including each of these types of fish.

The conventional tuna packing plant is usually located adjacent a dock suitable for unloading fish from a vessel. When the fish are unloaded from a vessel they are generally partially thawed. When the thawing has been completed the fish are thereafter eviscerated. The eviscerated fish are placed in wire baskets and the baskets loaded onto wheeled racks. The loaded racks are thereafter moved into a metal, steam-receiving precooking oven. The precooking oven is usually of rectangular configuration and has a capacity of several racks. During the precooking operation sufficient steam is admitted to the interior of this precooking oven to maintain it at a temperature generally varying between 212 and 220 degrees Fahrenheit and at superatmospheric pressure. At the conclusion of the precooking operation the racks are moved out of the precooking oven into a cooling room. This cooling room is usually open to the atmosphere and its temperature and humidity vary in accordance with atmospheric conditions. The fish remain in the cooling room until their temperature has been reduced to the point that they may undergo manual handling and are sufficiently firm that they may be cleaned. The cooling process usually requires from twelve to twenty-four hours. When the fish have been cooled to the desired temperature they are moved out of the cooling room and into the cleaning area of the plant. The fish cleaning operation requires manual labor and in cleaning a fish the head is removed and the skin and fins scraped off. The fish is then split and the backbone removed. Each half is split again longitudinally and the dark meat carefully scraped away. Four large longitudinal muscles called loins are then cut to can size and packed in the cans by hand or mechanical means.

The aforedescribed conventional method of precooking fish gives rise to several marked disadvantages. In order to cook the inner portions of the fish at the desired temperature the external portions thereof are often subjected to the action of the steam to such an extent that they are scorched. This scorching results in a darkening or browning of the meat. Since it is important that the meat to be canned is of a white or light color, such brown discoloration must be removed by skillful hand scraping. This scraping not only reduces the yield of usable meat but it additionally requires an added expenditure of labor. It has also been determined that because of the high cooking temperatures the rate of heat exchange between the steam and the meat of the fish causes the meat's cell structure to expand so rapidly that the fish juices undergo excessive evaporation. Such excessive evaporation causes a decrease in the ultimate yield realized from the fish. Since the cost of the raw fish generally represents approximately seventy percent of the total cost of the canning operation, this is a serious problem. An additional disadvantage of the conventional precooking operation results from the considerable number of fish loins that are split because of exposure to the high temperature steam. Such splitting not only renders the cleaning operation more time-consuming but it also lowers the percentage of meat available for solid pack canning.

It is a major object of the present invention to eliminate each of the aforementioned disadvantages of the existing conventional method of precooking fish for canning.

Yet another object is to provide a method of precooking fish for canning which may be conducted with existing equipment after effecting slight and comparatively inexpensive modification of such equipment.

A further object is to provide a method of precooking fish for canning which appreciably raises the yield of usable meat as compared to existing methods.

These and other objects and advantages of the present invention will become apparent from the following detailed description when taken in conjunction with the appended drawings wherein.

Figure 1:
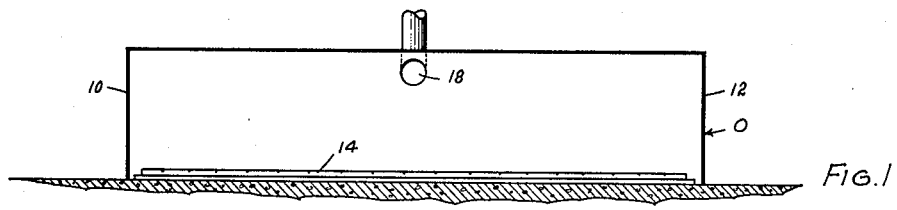
Figure 1 is a side view showing a precooking oven which may be employed in carrying out the method of the present invention.

Referring to the drawings, the method of the present invention may be carried out in a precooking oven designated O. This precooking oven O is of generally rectangular configuration and includes a loading door 10 at its left-hand portion and an unloading door 12 at its right-hand portion. The interior of this oven O is supplied with steam by conventional steam nozzles 14. These nozzles are in communication with a suitable source of steam (not shown). The interior of the oven O is also formed with one or more openings 18 having communication with a source of vacuum, such as a vacuum pump or steam jet (not shown). A suitable water drain (not shown) is provided for the floor of the oven O.

Figure 3:
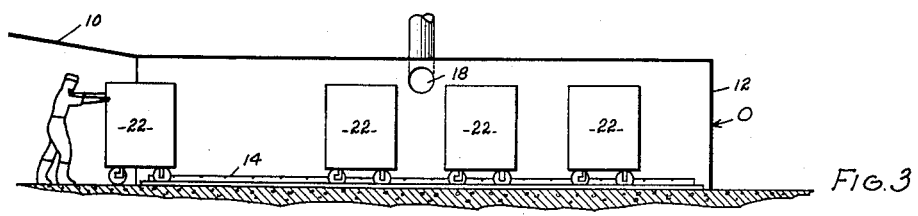
Figure 3 is a side view showing how said precooking oven is loaded.
Figure 2:
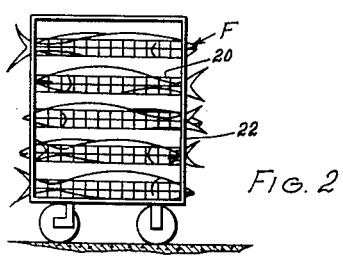
Figure 2 is an enlarged view showing the fish-holding baskets and racks employed in carrying out the method of the present invention.

Referring to Figures 2 and 3, the fish F to be prepared for canning are disposed within wire baskets 20 that are loaded upon wheeled racks 22. As indicated in this figure, the loaded racks 22 are moved into the precooking oven O through the loading door 10, the unloading door 12 being closed. Thereafter, the loading door 10 is closed and with both doors shut the interior of the oven O is substantially isolated with respect to the atmosphere.

Figure 4:
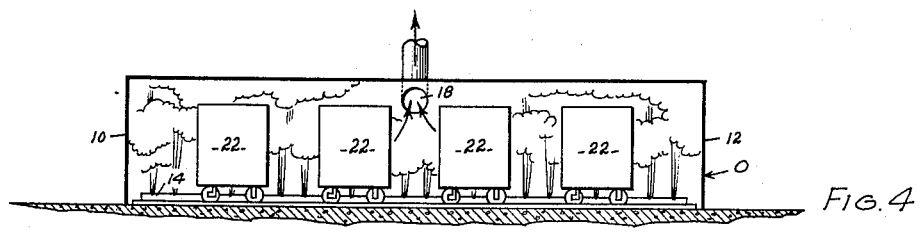
Figure 4 is a side view showing the precooking step.
Figure 5:
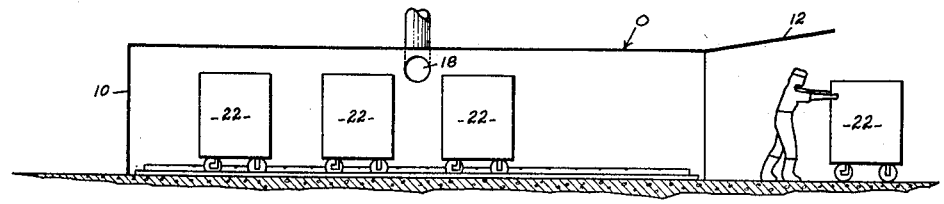
Figure 5 is a side view showing the manner in which said precooking oven is unloaded.

Referring now to Figure 4, with the loading and unloading doors shut, steam is admitted to the oven O through the nozzles 14. As this steam is admitted the air originally contained within the oven will be displaced either through the opening 18 or through conventional one-way vents (not shown). When the air has been substantially displaced from the oven O, the steam will be admitted at a slower rate. This rate of steam admission should be less than that required to replace the loss of steam caused by condensation as the steam heats the fish, by radiation from the oven walls and any other normal losses. Accordingly, such condensation will effect a pressure drop within the oven below atmospheric pressure. Since the oven interior then exists at subatmospheric pressure the fish may be cooked at a temperature considerably lower than the conventional temperature of 212 to 220 degrees Fahrenheit, the exact temperature being proportional to the pressure and the time of cooking. Preferably, any air entering the oven O by leakage will be drawn off through the opening 18.

In practice, a pressure range of 10 to 14 p.s.i.a. has been found satisfactory, with a pressure of approximately 11.5 p.s.i.a. being preferable. The temperature within the oven should be in the order of 200 degrees Fahrenheit. Preferably, the oven will be maintained free of air with such air being completely replaced by steam, i.e., water vapor. The fish should be cooked under these conditions until the temperature at the densest portion of the fish meat reaches 160 to 180 degrees Fahrenheit. This generally requires from one hour, fifteen minutes, to seven hours, depending upon the size of the fish being cooked.

It has been determined that as a result of the utilization of the lower cooking temperature of the aforedescribed method, the external portions of the meat will not be scorched. Additionally, since the cell structure of the fish meat will expand at a comparatively low rate, excessive evaporative losses of the fish juices are avoided. Moreover, the usual splitting of the fish loins is likewise avoided.

Although the aforedescribed method of the present invention has been described in connection with the preparation of tuna and tuna-like fish for canning, it will be apparent that it may also be applicable to the canning of other types of fish. It will likewise be apparent that various modifications and changes may be made with respect to the foregoing detailed description without departing from the spirit of the invention or the scope of the following claims.

This is a continuation-in-part of application Serial No. 649,458, filed March 29, 1957, and now abandonded.

We claim:

1. A method of precooking tuna-like fish for canning which includes arranging the fish in an initially air-filled zone, substantially isolating said zone from the atmosphere, admitting steam into said zone while venting the air originally disposed therein until the steam substantially fills said zone, continuing to admit steam into said zone at a rate less than that required to replace the steam loss by condensation so as to maintain said zone at a subatmospheric pressure approximating 10 to 14 p.s.i.a., maintaining said subatmospheric pressure of the steam within said zone for a time required to heat the meat in the densest portion of the fish to a temperature approximating 160 degrees Fahrenheit to 180 degrees Fahrenheit.

2. A method of precooking tuna-like fish for canning which includes arranging the fish in an initially air-filled zone, substantially isolating said zone from the atmosphere, admitting steam into said zone while venting the air originally disposed therein until the steam substantially fills said zone, continuing to admit steam into said zone at a rate less than that required to replace the steam loss by condensation so as to maintain said zone at a subatmospheric pressure approximating 10 to 14 p.s.i.a. while applying a vacuum to said zone so as to withdraw any air leaking thereinto, maintaining said subatmospheric pressure of the steam within said zone for a time required to heat the meat in the densest portion of the fish to a temperature approximating 160 degrees Fahrenheit to 180 degrees Fahrenheit.

References Cited in the file of this patent

UNITED STATES PATENTS

| | | |
|---|---|---|
| 1,201,522 | Stafford | Oct. 17, 1916 |
| 1,252,865 | Thompson | Jan. 8, 1918 |
| 2,493,586 | Lang | Jan. 3, 1950 |
| 2,708,636 | Rivoche | May 17, 1955 |